United States Patent [19]

Swank

[11] Patent Number: 5,759,697
[45] Date of Patent: Jun. 2, 1998

[54] ELECTRICALLY CONDUCTIVE TRANSPARENT DOPED TIN OXIDE FILMS

[75] Inventor: Thomas F. Swank, Sudbury, Mass.

[73] Assignee: Nyacol Products Inc., Ashland, Mass.

[21] Appl. No.: 740,984

[22] Filed: Nov. 5, 1996

Related U.S. Application Data

[62] Division of Ser. No. 413,828, Mar. 30, 1995, Pat. No. 5,626,975, which is a division of Ser. No. 323,622, Oct. 17, 1994, which is a division of Ser. No. 194,739, Feb. 14, 1994, abandoned.

[51] Int. Cl.$^6$ ........................ B32B 17/06
[52] U.S. Cl. .............. 428/432; 428/697; 428/699; 428/701
[58] Field of Search ..................... 428/697, 699, 428/701, 432, 702

[56] References Cited

U.S. PATENT DOCUMENTS

| | | | |
|---|---|---|---|
| 4,248,687 | 2/1981 | Fan | 422/160 |
| 4,775,412 | 10/1988 | Nishikura et al. | 252/501.1 |
| 4,859,496 | 8/1989 | Toyonaga et al. | 427/53.1 |
| 4,880,703 | 11/1989 | Sakamoto et al. | 428/404 |
| 4,900,634 | 2/1990 | Terneu et al. | 428/702 |

*Primary Examiner*—Archene Turner
*Attorney, Agent, or Firm*—Alvin Isaacs

[57] ABSTRACT

Disclosed is a novel system for providing transparent electrically conductive tin oxide coatings on substrates, which system includes the steps of doping a tin oxide colloid stabilized with ammonium ions with antimony, coating the resulting mixture onto the substrate to be provided with the electrically conductive coating, and then drying or baking for a time and at a temperature sufficient to lower the sheet resistance of the coating to the desired level.

13 Claims, No Drawings

ELECTRICALLY CONDUCTIVE TRANSPARENT DOPED TIN OXIDE FILMS

RELATED APPLICATIONS

This application is a division of my Application, Ser. No. 08/413,828 filed Mar. 30, 1995 now U.S. Pat. No. 5,626,975, which in turn is a division of Ser. No. 08/323,622 filed Oct. 17, 1994 as a continuation-in part of Ser. No. 08/194,739 filed Feb. 4, 1994 and now abandoned.

BACKGROUND OF THE INVENTION

This invention relates to electrically conductive transparent tin oxide coatings and, more particularly, to an improved method for rendering transparent substrates such as windows and the like electrically conductive with a transparent coating of tin oxide sol.

In order to impart electrical conductivity to substrates, thin metallic films of conductive inorganic oxide coatings have heretofore been deposited on the surface of the substrate by the vapor phase method, such as CVD method, PVD method and vapor deposition, etc. It is also known in the art to dope tin oxide with antimony by an evaporative process to impart greater electrical conductivity. However, these techniques suffer from the disadvantage of requiring very large vacuum deposition apparatus or evaporation chambers, or stated another way, the size or shape of the substrate contemplated to be rendered electrically conductive is limited to the size and shape of the available apparatus for vacuum deposition of the conductive material.

While not intended to represent the state of the art, the following patents cited during the prosecution of the parent case, Ser. No. 08/194,739 warrant brief mention.

U.S. Pat. No. 4,594,182 issued to Hashimoto et al describes another method of imparting electrical conductivity to a substrate utilizing aqueous indium oxide sols doped with tin oxide. However, indium oxide is very expensive compared to tin oxide doped with antimony oxide.

U.S. Pat. No. 4,576,921 describes and claims a tin oxide doped with antimony oxide made into a stable sol with the use of a quaternary ammonium hydroxide suitable for making gels and ceramic materials. However, there is no teaching of any use as coatings and, in fact, because they are prone to crazing, they are not suitable for coatings.

Stated simply, the task of this invention is to provide methods for imparting electrical conductivity to transparent coatings with tin oxide sols, which methods obviate the above-noted disadvantages of the prior techniques.

BRIEF DESCRIPTION OF THE INVENTION

In accordance with this invention, the task is solved in an elegant manner by providing novel procedures wherein the transparent electrically conductive film of tin oxide doped with antimony oxide consists essentially of an aqueous tin oxide colloid applied to a substrate and which colloid has been stabilized with ammonium ions and thereafter doped with antimony oxide while maintaining the transparency of the colloid.

DETAILED DESCRIPTION OF THE INVENTION

As was heretofore mentioned, the present invention, the present invention relates to improvements in methods of making transparent electrically conductive films with tin oxide sol coatings.

It is known to dope tin oxide powder with antimony to provide an electrically conductive material having greater conductivity than the tin oxide alone. However, this doping is performed by evaporative processes, which processes suffer the disadvantage of requiring very large equipment for large substrates and, further, of restricting the size and shape of the substrates to be rendered electrically conductive to the size and shape of the available evaporative deposition equipment.

The present invention obviates these disadvantages by a novel system employing as the starting material a tin oxide colloid wherein the cations, such as potassium ions, which are present to provide stability against increased viscosity during shelf life but which have an adverse effect on electrical conductivity have been replaced by ammonium ions.

This colloid is doped with antimony in one of the following two alternate procedures:

(1) mixing with antimony pentoxide sol; or
(2) mixing with antimony trioxide powder.

In either procedure, following mixing the resulting mixture is coated onto the substrate, dried, and optionally baked at a time and for a temperature sufficient to lower the sheet resistance to the desired level.

In accordance with this invention, in either procedure the coating may be applied in a single step, that is, as a single layer of the tin oxide colloid doped with antimony. However, it has been found that the resistance may be lowered still further if the coating is applied in a plurality of steps to provide two or more layers or strata of the colloid doped with antimony. The layers may be applied in consecutive steps prior to baking or, alternatively, the additional layer(s) may be applied after baking the first layer.

The amount of antimony applied to dope the colloid may vary and will in general be in an amount effective to improve the electrical conductivity over that obtained without the doping. When colloidal antimony oxide is employed for doping, the ratio by weight of antimony oxide to the tin oxide colloid may, for example, be on the order of from about 1:100 to about 20:100 on a dry oxide basis; and when antimony oxide powder is employed for the doping, the ratio of the antimony oxide powder to the tin oxide colloid may be on the order of from about 1:200 to about 25:100 on a dry weight basis.

The preferred tin oxide sols to be employed in the practice of this invention are those described and claimed in U.S. Pat. No. 5,158,705 issued Oct. 27, 1992 to the instant Applicant, Thomas F. Swank, and assigned to the common assignee, Nyacol Products Inc.

As disclosed therein, these tin oxide sols are negatively charged sols having substantially uniform particle size no greater than about 50 nanometers (nm) and preferably from about 5 to about 20 nm, the sols further being characterized as being substantially free of any other reagents which can adversely affect the contemplated usage in certain catalyst applications.

According to the teachings of this patent, these tin oxide sols may be obtained simply by admixing a tin salt, preferably an alkali metal stannate, and an aqueous slurry of a weak acid ion exchange resin to deionize the salt and thereby form the tin oxide sol in such a manner as to maintain a substantially constant alkaline pH for the slurry, e.g. a pH of at least 8.0. Useful ion exchange resins per se comprise no part of the present invention, are known in the art and are described, for example, in the first paragraph of Col. 2 of the aforementioned U.S. Pat. No. 5,158,705, which disclosure is incorporated by reference herein.

As is further stated in Applicant's '705 patent, the particle size may be controlled so as to provide a substantially constant pH of at least 8.0, preferably at least 8.4 or on the order of pH 10 or higher, simply by placing an aqueous solution of all the tin salts for a particular batch operation in a reactor vessel and then slowly adding the cation exchange resin in order to decrease the pH slowly from a pH in excess of 10.0, e.g. on the order of 13.0, to the desired lower pH of 8.0 or higher. However, as stated therein, the preferred method is by placing a small charge of the resin slurry in the reactor vessel and then adding a small amount of the tin salt to initiate the tin oxide formation at a pH of on the order of 8.0 to 10.0 and then immediately commencing to slowly add the remainder of the tin salt along with the resin on an as needed basis to maintain a fairly constant pH of at least 8.0 and preferably at least 8.4. The pH may be adjusted, if desired, by the addition of more resin to provide a sol which, after separation of the resin beads and concentration, will possess the particular desired alkaline pH.

The preferred tin oxide salts employed in the practice of this invention are alkali metal stannates, e.g. potassium, sodium or lithium stannate, including mixtures thereof, potassium stannate being particularly preferred. Typically, the ratio by volume of resin in cubic centimeters to weight of tin salt in grams to be employed to obtain a tin oxide sol having the desired pH may be on the order of from about 1:1 to about 1:3. [Since it is more accurate to measure the resin by volume than by weight, it is preferred to express the ratio in this manner rather than by weight to weight or by volume to volume.

Tin oxide sols such as the preferred ones mentioned above and described and claimed in Applicant's aforementioned U.S. Pat. No. 5,158,705 can be said to be the starting materials in the practice of this invention.

As heretofore mentioned, however, the alkali metal counterions present in the sol adversely affect conductivity. Accordingly, in the practice of this invention these known sols are put through a deionization process to replace the alkali metal counterions present in the sol with ammonium ions. This may be accomplished, for example, by mixing the tin oxide sol with a cation exchange resin in the ammonium ion form, thereby removing the alkali metal ions and replacing them with ammonium ions.

The resulting sols, which can be described as being tin oxide colloids stabilized with ammonium ions are per se old. For example, a tin oxide colloid stabilized with ammonium ions is commercially available from Nyacol Products Inc., the present assignee, under the trade designation SN-15CG (wherein CG stands for catalyst grade).

As was previously stated, it is also known in the art to dope tin oxide (not tin oxide sols) with antimony to make a more conductive material. However, this is generally done by an evaporative process which inherently suffers the disadvantages of requiring very large equipment for large windows and restricting the size and shape of the substrates to be rendered electrically conductive to the available evaporative deposition equipment.

The present invention obviates these disadvantages by providing a novel system wherein a tin oxide colloid stabilized with ammonium ions is doped with antimony coated on the window or other substrate to be rendered electrically conductive and then dried and/or baked for a time and at a temperature sufficient to lower the sheet resistance to the desired level.

There is a whole range of coating conductivities that would be useful for practical applications. Since coating conductivities are usually expressed as the reciprocal of conductivity, i.e. "surface resistivity" or "sheet resistance", one could state the practical ranges in terms of "ohms per square" or, simply, "ohms". A brief review of the origins of these units is thought appropriate.

The resistivity of a bulk conductor, such as metal, is determined by measuring the resistance of a sample of known dimensions. Samples of known length and cross-sectional area are usually used. A current is supplied to the ends of the sample and the voltage between the electrodes is measured and the resistivity is found by the equation:

Resistivity $P(Rho) = V/I \times A/L$ where V is voltage; I is current; A is the cross-sectional area; and L is the distance between the electrodes. Solving this equation using square centimeters for the area and centimeters for the length, the units for P, the resistivity, are ohm×cm or ohm−cm.

When the sample, or in this case, the coatings, are extremely thin, it is difficult to measure the thickness accurately. Accordingly, the coating is regarded as two-dimensional and thus it is desired to measure its "surface resistivity" which is determined from:

$\Sigma(Sigma) = V/I \times W/L$ where W is the width of the sample perpendicular to the current and L is the length of the sample in line with the current flow. The units of W and L cancel and therefore the units for $\Sigma$ are just ohms, the same as V/I.

To avoid confusion between surface resistivity and resistance, it is customary to present $\Sigma$ as "ohms per square" (not "ohms per square centimeter or inch", not "ohms squared", but just "ohms per square" or "ohms/square") The term "ohms per square" is found in literally hundreds of U.S. patents. In the semiconductor industry this is often called "the sheet Rho" or "sheet resistivity". The V/I reading (ohms) is called "sheet resistance".

One method of measuring sheet resistivity is to follow ASTM procedure D257, which requires a sample test chamber and a picoammeter/voltage source to make the appropriate measurements of ohms per square. While these measurements are more accurate, it is known in the industry that substantially the same results will be obtained by measuring sheet resistance. As a diagnostic or test procedure, the differences between the results of the respective procedures are insignificant.

Sheet resistance has been measured in the present invention by using a digital multi-meter (Volt-ohm-amp meter) with the electrodes approximately 3 mm apart, essentially producing the V/I readings and the units of ohms mentioned previously. Additional confirmation of this good agreement between sheet resistivity and sheet resistance has been confirmed by several independent laboratories that have been testing the coatings made from the colloids according to the present invention.

Accordingly, the reported electrical properties of the conductive coatings as described hereinafter will be reported as "sheet resistance" whose units are ohms.

In the following examples, which show by way of illustration and not by way of limitation the practice of this invention, the recited coatings have been applied mainly to two types of substrates: (1) 3×3 Pyrex glass plates; and (2) 3 inch diameter silicon wafers that have previously been oxidized to a uniform $SiO_2$ surface on the wafer.

These substrates have been dipped-coated to provide coatings of approximately 200 nm. in thickness which are crack-free and extremely durable. The amount of heating after applying the coating will determine both the durability and the conductivity range.

Useful conductivities range from $10^8$ ohms which find utility as anti-static coatings on any surface that will accumulate an electric charge, through all the lower values of sheet resistance. Each resistance range has its own practical importance in the art, depending on the particular application contemplated.

The coatings prepared in accordance with this invention will produce a lower sheet resistance as the heating time and/or temperature increase. Accordingly, an anti-static coating, e.g. $10^8$ ohms, may be prepared by simply drying at 70°–100° C. for a short time, e.g. 15 minutes; while the same coating can produce a substantially higher conductivity, e.g. 103 ohms, by heating at 500° C. for several hours.

EXAMPLE 1

To about 8000.0 gms. of SN15CG tin oxide colloid stabilized with ammonium ions were slowly added, with mixing, about 321.0 gms. of DP5580 antimony pentoxide sol at a concentration of about 19.6%. Mixing was continued for an additional 30 minutes for an additional 30 minutes following completion of the antimony pentoxide sol. The resulting solution was then filtered to remove any agglomerates or clumps. The filtered solution was then coated onto a 3 inch square glass plate by mounting the plate in the sol in a plastic container fitted with a bottom drain. The liquid level of the solution was lowered at a constant rate by flowing the sol out of the bottom drain through a flow meter. The coated glass was allowed to air dry and was then dried further at 70° C. for about 10 minutes to provide a substantially clear coating. The resistance of the coating was measured with a multi-meter at 100–200 ohms ($1–2\times10^8$ ohms) to provide a transparent anti-static coating on the glass.

EXAMPLE 2

The anti-static coating on the glass plate of Example 1 having a resistance measured at 100–200 megaohms was heated at 500° C. for about 18 hours to provide an electrically conductive coating on the glass in which the sheet resistance was determined to be 5000 ohms.

EXAMPLE 3

To about 3000.0 gms. of SN-15CG (15% concentration) tin oxide sol about 30.0 gms. of antimony trioxide powder were added at room temperature with stirring. The stirring was continued for about 72 hours after addition was completed until substantially all of the powder reacted with the tin oxide particles, as evidenced by a change in color from a white slurry to a pale red transparent sol of small particle size. The resulting sol was filtered to remove unreacted antimony trioxide and was then coated onto a glass plate in the manner described in Example 1 to provide a substantially transparent coating. After drying, the sheet resistance was 20 megaohms ($2\times10^7$ ohms). It was then baked at 600° C. for 18 hours, at which time the sheet resistance was lowered to about 700 ohms.

EXAMPLE 4

Example 3 was repeated, except that the mixing step was accelerated from 72 hours to about 24 hours by heating to 70°–80° C.

In the foregoing illustrative examples, the coating was applied to the substrate in a single step, i.e. as a single layer. However, as previously stated, in accordance with this invention it has been found that the sheet resistance can be lowered still further if at least one additional layer of coating is applied, that is, if the coating is applied in at least two steps.

The following two examples illustrate this latter embodiment of the invention.

EXAMPLE 5

Example 3 was repeated, except that after coating the sol onto the glass plate and drying, but before baking, a second layer of sol was coated onto the dried initial coating. The glass plate containing the two sol coatings was then baked as described in Example 3 (at about 600° C. for about 18 hours) at which time the sheet resistance was lowered from the 700 ohms obtained in Example 3 with the single coating to about 300 ohms.

EXAMPLE 6

Example 3 was repeated again, except that after baking to lower the resistance to about 700 ohms, a second coating was applied in the same manner (over the baked initial coating), dried, and the baking step then repeated. Again, the sheet resistance was found to be lowered to about 300 ohms.

From the foregoing description and illustrative examples, it will thus be seen that the present invention provides a simple and elegant system for applying transparent electrically conductive tin oxide coatings to any substrate such as glass windows where a transparent coating is desired, which system accomplishes the stated task of the invention by obviating the heretofore noted disadvantages of prior systems utilizing evaporative depositions to apply the coating.

Since it will be appreciated that certain changes may be made without departing from the spirit and scope of the present invention, it is to be understood that the foregoing description, including the examples, is to be taken as illustrative and not in a limiting sense.

What is claimed is:

1. An electrically conductive transparent film of tin oxide prepared by the method consisting essentially of the steps of:
   (a) admixing an alkali metal stannate salt and an aqueous slurry of a weak acid ion exchange resin to deionize the salt and thereby form a tin oxide colloid maintaining a substantially constant pH of at least 8.0 and having a particle size no greater than about 50 nm;
   (b) replacing alkali metal ions in the colloid which have an adverse effect on electrical conductivity with ammonium ions;
   (c) doping the colloid with antimony;
   (d) coating onto a substrate at least one layer of the tin oxide colloid which is doped with antimony and having its alkali metal ions replaced with ammonium ions; and thereafter
   (e) drying or baking the coated substrate for a time and at a temperature sufficient to lower the sheet resistance to a predetermined level.

2. An electrically conductive transparent film as defined in claim 1 wherein the antimony for doping the tin oxide colloid is provided by the step of mixing the colloid with antimony trioxide powder.

3. An electrically conductive transparent film as defined in claim 1 wherein the coating of tin oxide colloid consists of at least two layers consisting essentially of the tin oxide colloid.

4. An electrically conductive transparent film as defined in claim 1 wherein the coating of tin oxide colloid consists of first and second layers.

5. An electrically conductive transparent film as defined in claim 4 including the steps of drying the first layer after coating it on the substrate; coating the second layer on the substrate over the dried first layer; and thereafter baking the thus coated first and second layers of tin oxide colloid for a time and at a temperature sufficient to lower the sheet resistance to the predetermined level.

6. An electrically conductive transparent film as defined in claim 4 including the steps of baking the first layer after coating it on the substrate; thereafter coating the second layer over the baked first layer; and then baking the second layer to lower the sheet resistance to a predetermined level lower than the level of the baked first layer.

7. An electrically conductive transparent film of tin oxide prepared by the steps of:

(a) preparing a tin oxide colloid having alkali metal counterions which provide stability against increased viscosity during shelf life but which also have an adverse effect on electrical conductivity, the tin oxide colloid being characterized as maintaining a substantially constant pH of at least 8.0 and having a particle size no greater than about 50 nm;

(b) replacing the alkali metal counterions in the tin oxide colloid with ammonium ions;

(c) mixing antimony trioxide powder with the tin oxide colloid in order to dope the colloid, the antimony trioxide powder being in an amount effective to improve the electrical conductivity of the colloid over the electrical conductivity obtainable without the doping;

(d) coating onto a transparent substrate at least one layer of the tin oxide colloid doped with antimony trioxide and having alkali metal counterions replaced with ammonium ions; and thereafter (e) drying or baking the coated transparent substrate for a time and at a temperature sufficient to lower the sheet resistance to a predetermined level.

8. An electrically conductive transparent film as defined in claim 7 wherein the ratio by weight of antimony trioxide powder to the tin oxide colloid is from about 1:200 to about 25:100 on a dry weight basis.

9. An electrically conductive transparent film as defined in claim 7 wherein the tin oxide sol prior to substituting ammonium ions and doping with antimony trioxide powder is prepared by the steps of admixing an alkali metal stannate and an aqueous slurry of a weak acid ion exchange resin to deionize the salt and thereby to form the tin oxide colloid maintaining a substantially constant pH of at least 8.0 and having a particle size no greater than about 50 nm.

10. An electrically conductive transparent film as defined in claim 7 wherein the coating of tin oxide colloid consists of at least two layers of the tin oxide colloid.

11. An electrically conductive transparent film as defined in claim 7 wherein the coating of tin oxide colloid consists of first and second layers.

12. An electrically conductive transparent film as defined in claim 11 including the steps of drying the first layer after coating it on the transparent substrate; coating the second layer on the substrate over the dried first layer; and thereafter baking the thus coated first and second layers of tin oxide colloid for a time and at a temperature sufficient to lower the sheet resistance to the predetermined level.

13. An electrically conductive transparent film as defined in claim 11 including the steps of baking the first layer after coating it on the transparent substrate; thereafter coating the second layer over the baked first layer; and then baking the second layer to lower the sheet resistance to a predetermined level lower than the level of the baked first layer.

* * * * *